United States Patent [19]

Komoda et al.

[11] Patent Number: 5,604,799
[45] Date of Patent: Feb. 18, 1997

[54] SWITCHING TYPE ECHO CANCELER

[75] Inventors: Motoyoshi Komoda, Tokyo; Yoshiaki Hosoi, Saitama, both of Japan

[73] Assignee: NEC Corporation, Tokyo, Japan

[21] Appl. No.: 558,279

[22] Filed: Nov. 13, 1995

[30] Foreign Application Priority Data

Nov. 11, 1994 [JP] Japan ..................... 6-277638

[51] Int. Cl.⁶ ..................... H04M 9/00
[52] U.S. Cl. ............ 379/410; 379/406; 379/411; 379/390
[58] Field of Search .................. 379/410, 406, 379/411, 408, 409, 388, 389, 390; 381/71, 94, 95, 96

[56] References Cited

U.S. PATENT DOCUMENTS 4,064,378  12/1977  Kitayama et al. .............. 379/410
5,008,923  4/1991   Kitamura et al. .............. 379/407
5,430,796  7/1995   Komoda et al. ............... 379/388

Primary Examiner—Thomas W. Brown
Assistant Examiner—Jacques M. Saint-Surin
Attorney, Agent, or Firm—Sughrue, Mion, Zinn, Macpeak & Seas

[57] ABSTRACT

A switching type echo canceler includes speech sample storing RAMs on a line side and on a handsfree device side, tap coefficient storing RAMs on the line side and on the handsfree device side, a pseudo echo generation unit, a tap coefficient updating unit, a level comparison unit for comparing input signals on the line side and on the handsfree device side, and a plurality of switches for switching between the line- and hands-free-device-side echo cancel operations in accordance with a switching signal from the level comparison unit.

4 Claims, 5 Drawing Sheets

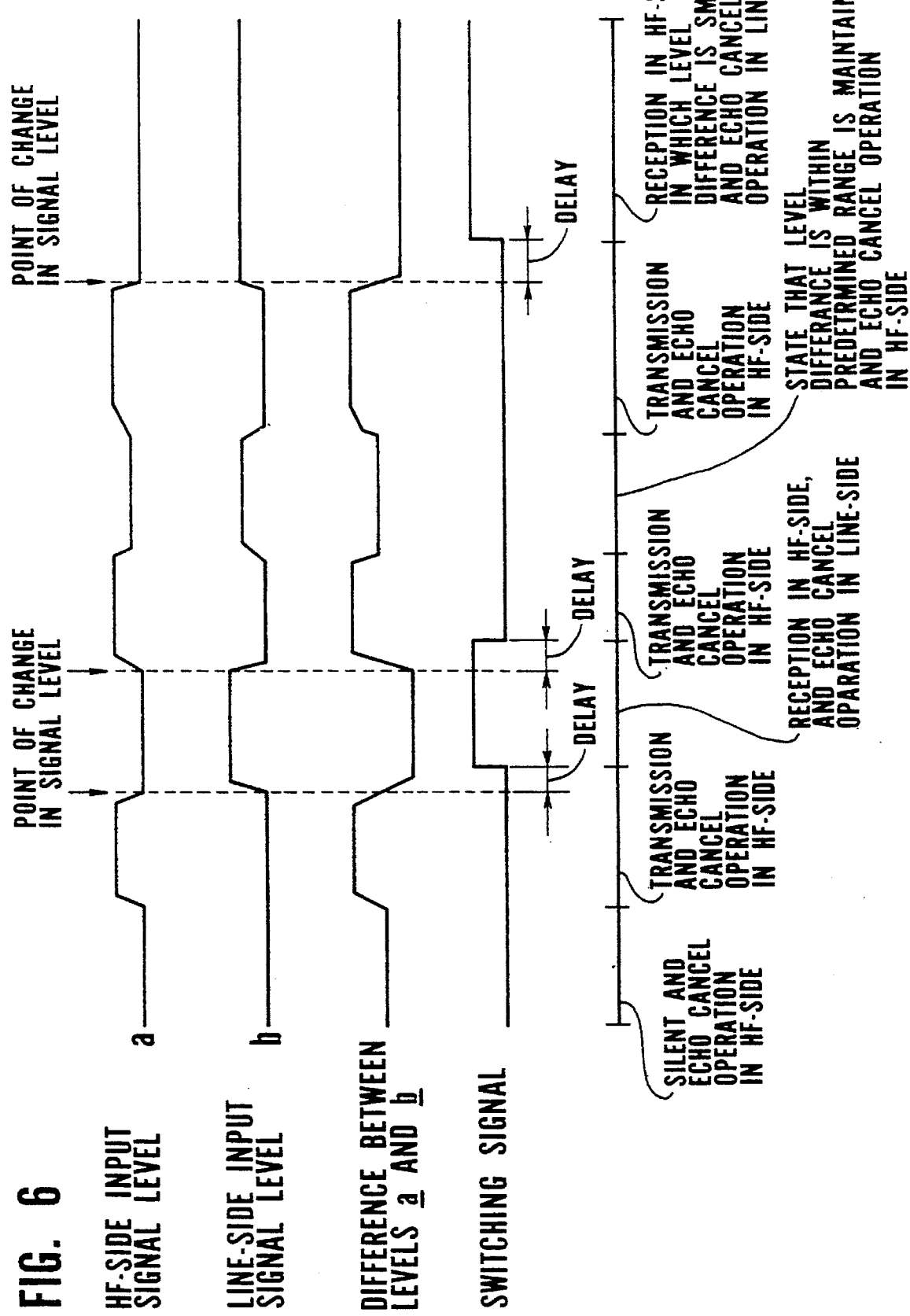

SWITCHING TYPE ECHO CANCELER

BACKGROUND OF THE INVENTION

1. Field of the Invention

The present invention relates to a switching type echo canceler and, more particularly, to a switching type echo canceler for suppressing an echo generated by speech circulation in a handsfree device for a mobile phone, in a handset, or on a line side.

2. Description of the Prior Art

The mechanism of echo generation in a handsfree device will be described below with reference to FIG. 1. As shown in FIG. 1, for a handsfree device in an automobile, a loudspeaker SP is placed close to feet on the passenger seat, and a microphone MIC is attached to the sun visor. When a speech communication is to be performed by using the handsfree device with the above arrangement, loud speech is output from the loudspeaker SP such that the driver can sufficiently hear it. When this speech is input to the microphone MIC, speech circulation occurs to generate an echo (reverberation). Additionally, a sound generated in a predetermined closed space spreads throughout the space and hits a variety of obstructions. Part of the sound is absorbed and attenuated while the remaining is reflected. The reflected sound further hits another obstructions and is repeatedly reflected while being absorbed and attenuated. At this time, the sound repeatedly reflected is partially input to the microphone MIC and transmitted in the transmission system, thereby generating an echo. As described above, an echo generated in an automobile has infinite acoustic coupling (echo path). The components (time delay and magnitude) of the echo are not always constant.

The mechanism of echo generation in a handset HS will be described below with reference to FIG. 2. As is apparent from FIG. 2, echo generation caused by acoustic coupling (speech circulation) in the handset HS is roughly classified into the following four cases:

(1) A speech output from the receiver (loudspeaker) is transmitted through the handset HS and input to the transmitter (microphone).

(2) A speech output from the receiver vibrates the handset HS and is input to the transmitter.

(3) A speech output from the receiver is transmitted through a space and input to the transmitter.

(4) A speech output from the receiver is transmitted through the human body and input to the transmitter.

There is also echo generation on a line side. This will be described below with reference to FIG. 3. As shown in FIG. 3, in a hybrid circuit HYB, transmitter speech $V_1$ on the four-wire side circulates into receiver speech $V_2$ (leakage $V_3$) and returns to the receiver, thereby generating an echo.

A conventional echo canceler for suppressing an echo has an arrangement as shown in FIG. 4. Speech circulation on the line side and acoustic coupling on the handsfree device (HF) side are independently canceled by independently provided echo cancelers 20A and 20B. The echo canceler 20A on the line side comprises a speech sample storing RAM 21 for storing an output signal to the line, a tap coefficient storing RAM 22, a pseudo echo generation unit 25 for receiving data from the speech sample storing RAM 21 and data from the tap coefficient storing RAM 22 to generate a pseudo echo for canceling an output signal circulating from the line side, and a tap coefficient updating unit 27 for updating the tap coefficient in the tap coefficient storing RAM upon reception of data from the speech sample storing RAM 21 and an output signal to the HF side. The echo canceler 20B on the HF side comprises a speech sample storing RAM 23 for storing an output signal on the HF side, a tap coefficient storing RAM 24, a pseudo echo generation unit 26 for receiving data from the speech sample storing RAM 23 and data from the tap coefficient storing RAM 24 to generate a pseudo echo for canceling acoustic coupling (speech circulation) from the loudspeaker on the HF side to the microphone, and a tap coefficient updating unit 28 for updating the tap coefficient in the tap coefficient storing RAM 24 upon reception of data from the speech sample storing RAM 23 and an output signal to the line.

If such a conventional echo canceler of a two-way simultaneous operation type is realized by a digital signal processor (DSP) chip, the arithmetic processing amount becomes twice that of one of the echo cancelers beyond the processing capability of the DSP. Therefore, such a device can hardly be realized by one chip and requires two expensive DSP chips. To manage to realize the device by one chip, the number of tap coefficients must be impractically decreased, resulting in a degradation in performance of the echo canceler. As a result, the expensive DSP chip is dedicated for echo cancel processing, and another signal processing cannot be simultaneously performed. If this function is to be realized by hardware, the circuit scale is doubled.

SUMMARY OF THE INVENTION

The present invention has been made in consideration of the above situation in the prior art, and has as its object to provide a switching type echo canceler which can simplify a means for realizing an echo canceler, i.e., which can shorten the processing time in a DSP chip and reduce the program scale, or reduce the circuit scale of hardware.

To achieve the above object, according to the main aspect of the present invention, there is provided a switching type echo canceler comprising a first subtracter for subtracting a first pseudo echo signal approximated to an echo generated on a transmitter/receiver side from a speech signal input from the transmitter/receiver side and sending a signal, a second subtracter for subtracting a second pseudo echo signal approximated to an echo generated on a line side from a speech signal input from the line side and sending a signal, first and second memory means for temporarily storing the signals sent from the first and second subtracters, third and fourth memory means for temporarily storing data representing tap coefficients for generating the first and second pseudo echo signals, pseudo echo generation means for generating the first pseudo echo signal upon reception of the data read out from the first and third memory means and generating the second pseudo echo signal upon reception of the data read out from the second and fourth memory means, tap coefficient updating means for updating the data in the third memory means upon reception of the signal sent from the first subtracter and the data read out from the first memory means and updating the data in the fourth memory means upon reception of the signal sent from the second subtracter and the data read out from the second memory means, level comparison means for comparing levels of input signals from the transmitter/receiver side and the line side and generating a switching control signal in accordance with a level difference, and switching means for switching a combination of signals supplied to the pseudo echo generation means and the tap coefficient updating means in response to the switching control signal.

According to the main aspect, a switching timing indicated by the switching control signal is set to be delayed by a predetermined delay time with respect to a change timing of a signal level comparison result obtained by the level comparison means.

In addition, a length of the delay time can be changed in accordance with a range of a change in signal level comparison result.

Furthermore, according to the main aspect, switching of the switching means is inhibited when the range of the change in signal level comparison result obtained by the level comparison means falls within a predetermined allowance.

In the present invention, the input level on the HF side is compared with that on the line side. When the HS-side input level is higher, an HF-side transmission mode is set, and the echo canceler is operated as a line-side echo canceler. When the line-side input level is higher, an HF-side reception mode is set, and the echo canceler is operated as an HF-side echo canceler. Therefore, only the line- or HF-side echo cancel operation is performed at a timing required by the echo canceler, so that the same function as of a conventional echo canceler having two equivalent echo cancelers can be realized.

More specifically, according to the present invention, an operation of only one of two echo cancelers for two-way echo cancel processing suffices, and the arithmetic processing amount of a DSP chip can be halved as compared to the prior art. Therefore, the circuit scale in realizing by hardware can be reduced. The tap number becomes twice that in the prior art for the two-way simultaneous operation, and the cancel time can be doubled. That is, the device can be realized by one DSP chip. In addition, another signal processing can also be performed by the single DSP chip.

The above and other advantages, features and additional objects of the present invention will become manifest to those versed in the art upon making reference to the following detailed description and accompanying drawings in which preferred embodiments incorporating the principle of the present invention are shown by way of illustrative example.

BRIEF DESCRIPTION OF THE DRAWINGS

FIG. 6 is a timing chart showing a switching operation in the embodiment of the present invention.

DETAILED DESCRIPTION OF THE PREFERRED EMBODIMENT

The present invention will be described below in more detail with reference to a preferred embodiment shown in the accompanying drawings.

Figure 1:
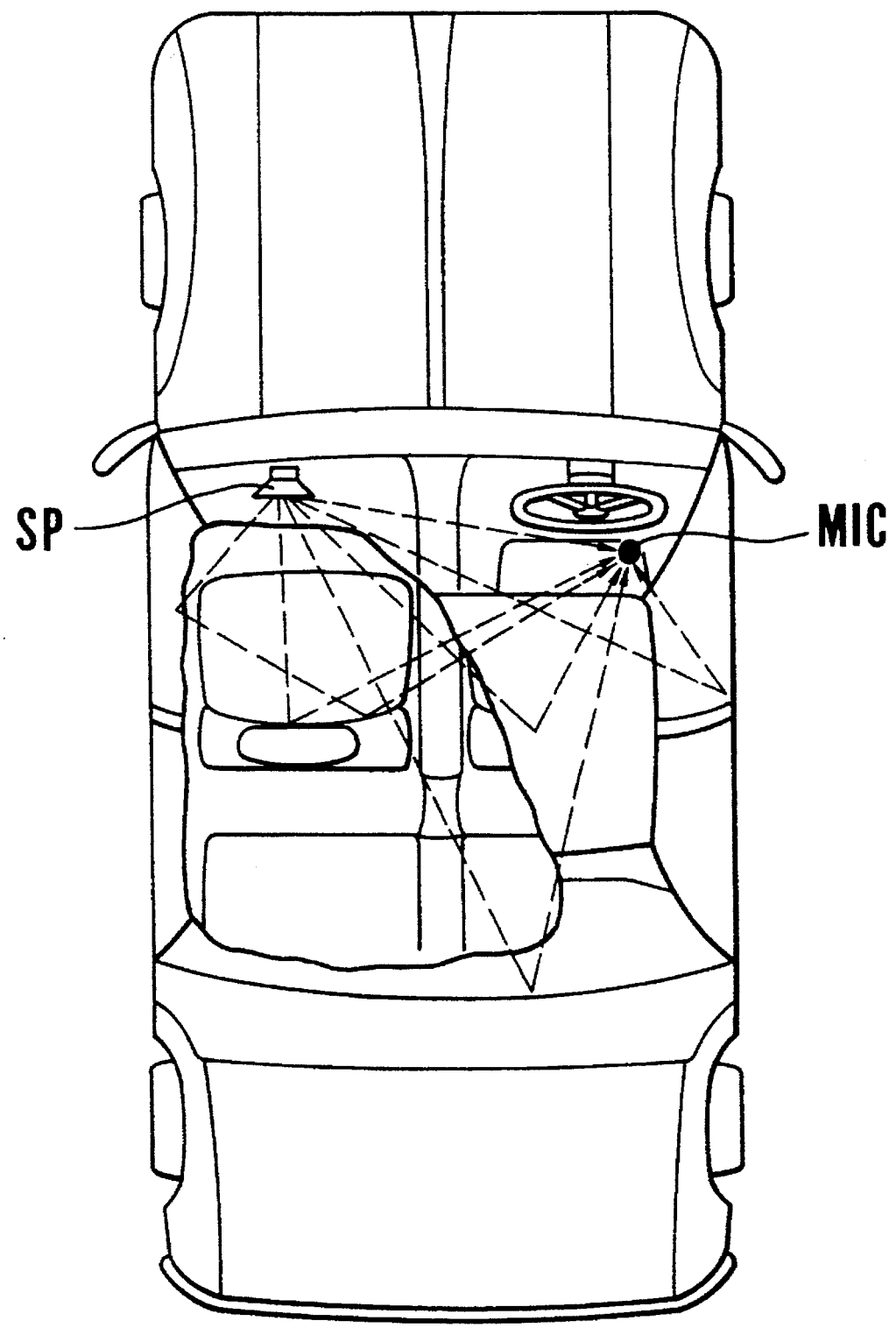
FIGS. 1 to 3 are views for explaining various mechanisms of echo generation.
Figure 2:
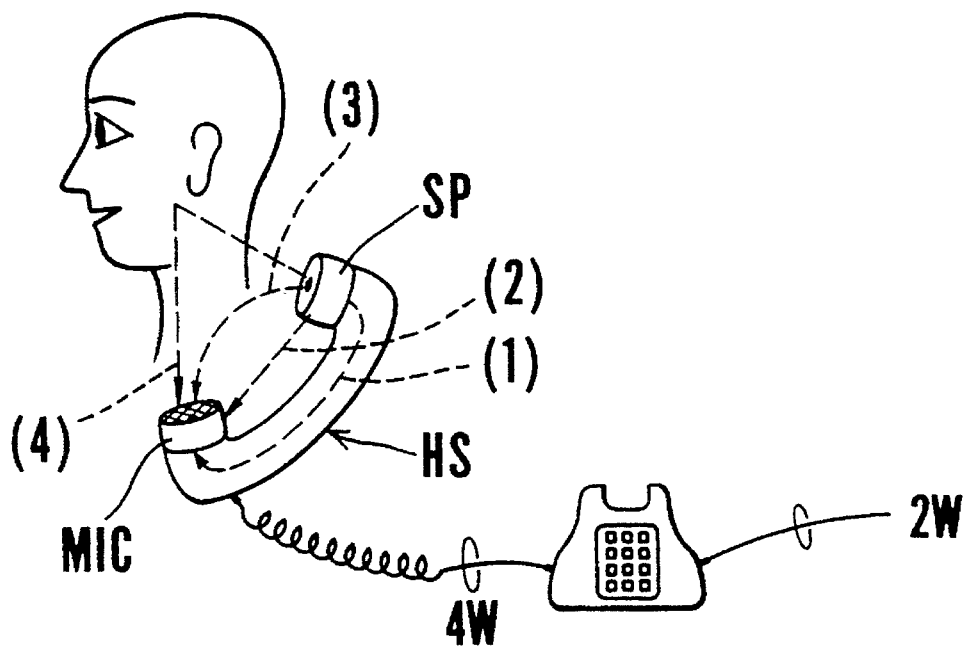
Figure 3:
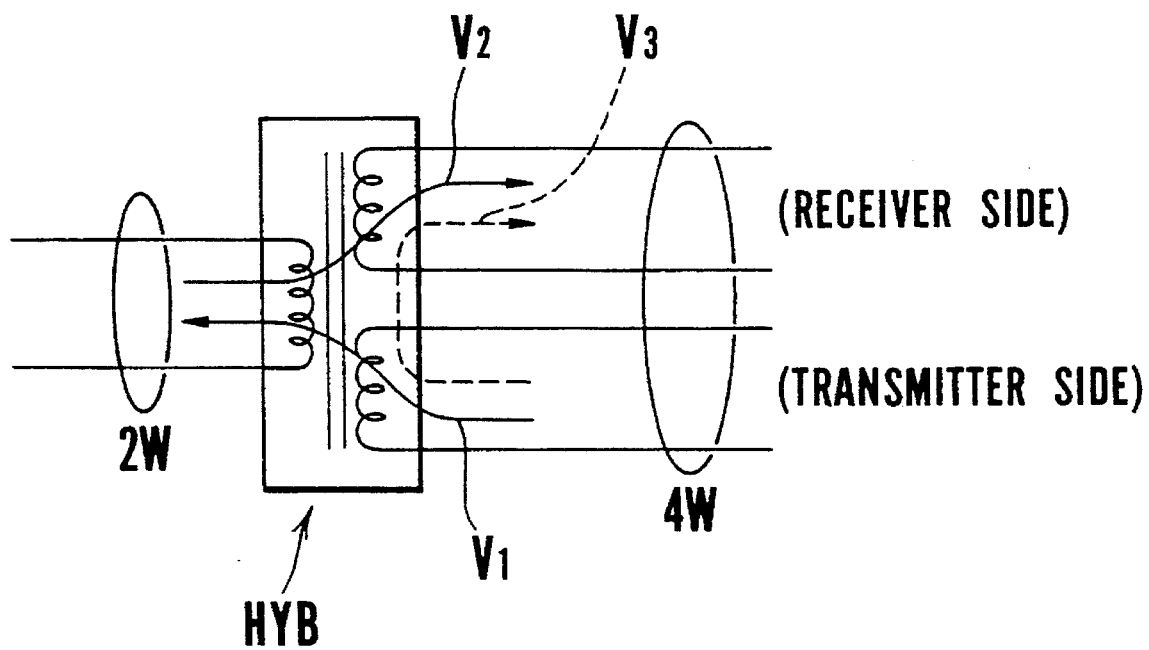
Figure 4:
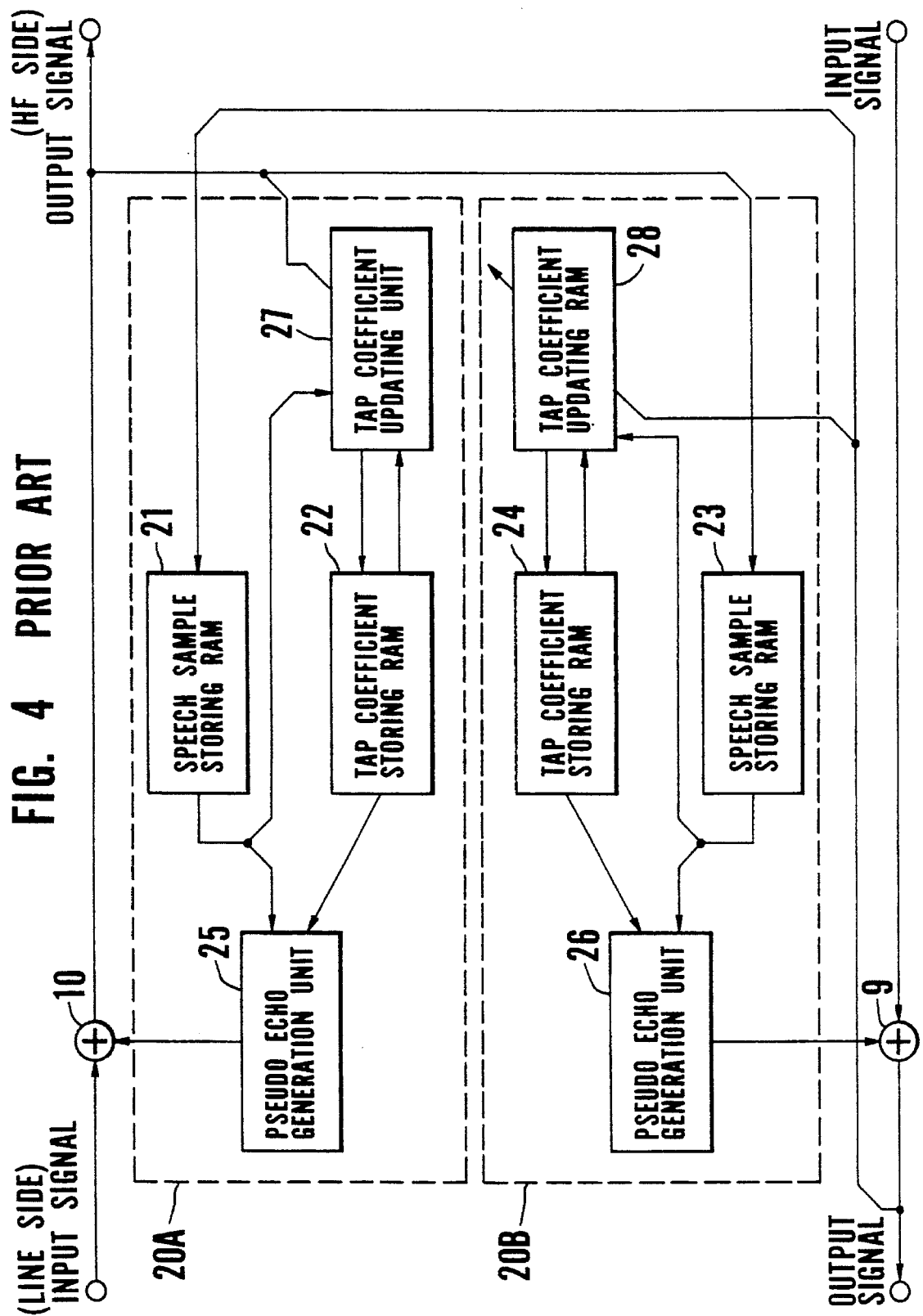
FIG. 4 is a block diagram showing a conventional echo canceler.
Figure 5:
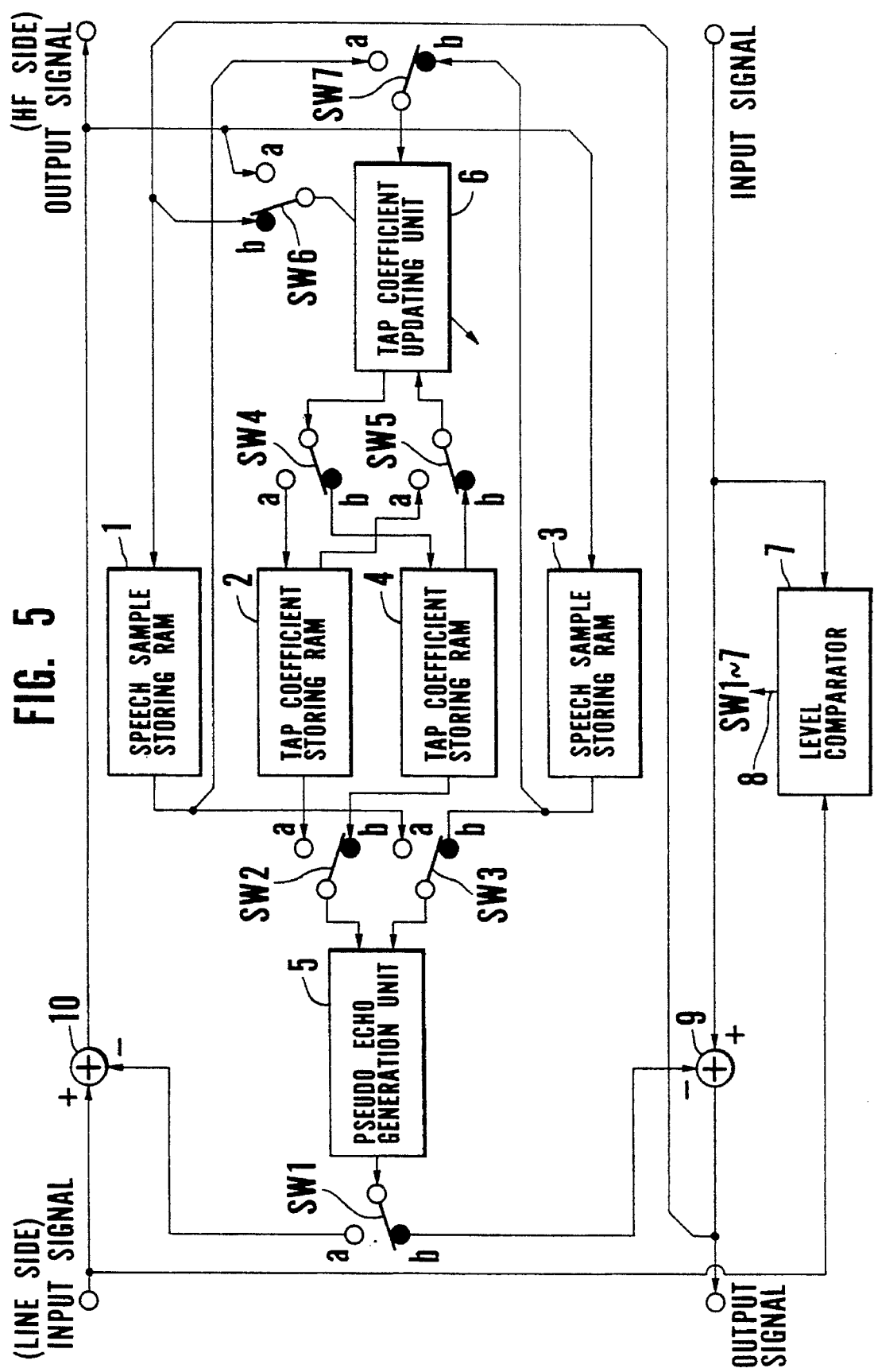
FIG. 5 is a block diagram showing an embodiment of the present invention.

FIG. 5 is a block diagram showing an embodiment of the present invention. Referring to FIG. 5, a speech sample storing RAM 1 stores an output signal on the line side in an operation as a line-side echo canceler. A tap coefficient storing RAM 2 stores the tap coefficient of the line-side echo canceler. A speech sample storing RAM 3 stores an output signal on the HF side in an operation as an echo canceler on a handsfree device (HF) side. A tap coefficient storing RAM 4 stores the tap coefficient of the HF-side echo canceler. A pseudo echo generation unit 5 generates a pseudo echo upon reception of a speech sample from the speech sample storing RAM 1 and a tap coefficient from the tap coefficient storing RAM 2, or a speech sample from the speech sample storing RAM 3 and a tap coefficient from the tap coefficient storing RAM 4. A tap coefficient updating unit 6 updates the tap coefficient in the tap coefficient storing RAM 2 upon reception of a speech sample from the speech sample storing RAM 1 and an output signal on the HF side, and also updating the tap coefficient in the tap coefficient storing RAM 4 upon reception of a speech sample from the speech sample storing RAM 3 and an output signal on the line side. A level comparator 7 compares an input signal on the line side with an input signal on the HF side and outputting a switching signal 8 in accordance with the level difference between the two signals. Switches SW1 to SW7 operate in an interlocked manner upon reception of the switching signal 8 and switch between the HF-side echo cancel operation and the line-side echo cancel operation. Subtracters 9 and 10 subtract the pseudo echo.

In a silent state during an operation of this embodiment, the switching signal 8 from the level comparator 7 indicates the HF-side echo cancel operation. In accordance with this signal, the switches SW1 to SW7 are connected to contacts b. Similarly, when the input signal level on the HF side is higher than that on the line side, the switching signal 8 from the level comparator 7 indicates the HF-side echo canceler. In accordance with this signal, the switches SW1 to SW7 are connected to the contacts b.

To the contrary, when the input signal level on the line side is higher than that on the HF side, the switching signal 8 from the level comparator 7 indicates the line-side echo cancel operation, and the switches SW1 to SW7 are connected to contacts a.

The switching signal 8 in this embodiment is not instantaneously switched in accordance with a change in level. Instead, as shown in a signal timing chart of FIG. 6, a predetermined delay time (DELAY) is set, and the delay time is changed in accordance with the input level difference between the line side and the HF side. More specifically, the larger the level difference is, the shorter the delay time is set, and the smaller the level difference is, the longer the delay time is set. When the level difference is within a predetermined threshold range, the switching signal 8 is not switched.

In the HF-side echo cancel operation, the tap coefficient updating unit 6 updates the tap coefficient in the tap coefficient storing RAM 4 by using the speech sample stored in the speech sample storing RAM 3 and an output signal on the line side. The pseudo echo generation unit 5 generates a pseudo echo from the updated tap coefficient and the speech sample in the speech sample storing RAM 3. The pseudo echo is subtracted from an input signal on the HF side to obtain an output signal on the line side. With this operation, an echo generated when an output signal reproduced by the loudspeaker on the HF side circulates due to acoustic coupling and is input to the microphone is canceled upon subtracting the pseudo echo signal generated from the output signal on the HF side.

In the line-side echo cancel operation, the tap coefficient updating unit 6 updates the tap coefficient in the tap coefficient storing RAM 2 by using the speech sample stored in the speech sample storing RAM 1 and an output signal on the HF side. The pseudo echo generation unit 5 generates a pseudo echo from the updated tap coefficient and the speech sample in the speech sample storing RAM 1. The pseudo echo is subtracted from an input signal on the line side to obtain an output signal on the HF side. With this operation, the echo generated on the line side is canceled.

As described above, in this embodiment, only one of the HF- and line-side echo cancelers is used by switching in accordance with the relative level difference between the transmitter side and the receiver side on the HF side. For this reason, the arithmetic processing amount in a DSP chip can be halved. Therefore, the device can be easily realized by one DSP chip without degrading the echo cancel performance.

What is claimed is:

1. A switching type echo canceler comprising a first subtracter for subtracting a first pseudo echo signal approximated to an echo generated on a transmitter/receiver side from a speech signal input from said transmitter/receiver side and sending a signal, a second subtracter for subtracting a second pseudo echo signal approximated to an echo generated on a line side from a speech signal input from said line side and sending a signal, first and second memory means for temporarily storing the signals sent from said first and second subtracters, third and fourth memory means for temporarily storing data representing tap coefficients for generating the first and second pseudo echo signals, pseudo echo generation means for generating the first pseudo echo signal upon reception of the data read out from said first and third memory means and generating the second pseudo echo signal upon reception of the data read out from said second and fourth memory means, tap coefficient updating means for updating the data in said third memory means upon reception of the signal sent from said first subtracter and the data read out from said first memory means and updating the data in said fourth memory means upon reception of the signal sent from said second subtracter and the data read out from said second memory means, level comparison means for comparing levels of input signals from said transmitter/receiver side and said line side and generating a switching control signal in accordance with a level difference, and switching means for switching a combination of signals supplied to said pseudo echo generation means and said tap coefficient updating means in response to the switching control signal.

2. A canceler according to claim 1, wherein a switching timing indicated by the switching control signal is set to be delayed by a predetermined delay time with respect to a change timing of a signal level comparison result obtained by said level comparison means.

3. A canceler according to claim 2, wherein a length of the delay time can be changed in accordance with a range of a change in signal level comparison result.

4. A canceler according to claim 1, wherein switching of said switching means is inhibited when the range of the change in signal level comparison result obtained by said level comparison means falls within a predetermined allowance.

* * * * *